(12) United States Patent
Tang (10) Patent No.: US 11,576,153 B2
(45) Date of Patent: *Feb. 7, 2023

(54) DEVICE-TO-DEVICE (D2D) COMMUNICATION METHOD AND D2D DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/446,892

(22) Filed: Sep. 3, 2021

(65) Prior Publication Data

US 2021/0400641 A1 Dec. 23, 2021

Related U.S. Application Data

(63) Continuation of application No. 16/095,770, filed as application No. PCT/CN2016/081714 on May 11, 2016, now Pat. No. 11,134,475.

(51) Int. Cl.
*H04W 72/04* (2009.01)
*H04W 92/18* (2009.01)

(52) U.S. Cl.
CPC ........... *H04W 72/04* (2013.01); *H04W 92/18* (2013.01)

(58) Field of Classification Search
CPC . H04W 72/04; H04W 72/0406; H04W 72/02; H04W 72/1278; H04W 92/18; H04W 4/70
See application file for complete search history.

(56) References Cited

U.S. PATENT DOCUMENTS

2015/0142986 A1 5/2015 Reznik et al.
2015/0271786 A1 9/2015 Xue et al.
(Continued)

FOREIGN PATENT DOCUMENTS

CN 104244416 A 12/2014
CN 104284340 A 1/2015
(Continued)

OTHER PUBLICATIONS

International Search Report in the international application No. PCT/CN2016/081714, dated Jan. 25, 2017.
(Continued)

*Primary Examiner* — Farid Seyedvosoghi (57) ABSTRACT

Disclosed are a device-to-device (D2D) communication method and a D2D device, the method comprising: a first D2D device generates a data packet, the data packet being a semi-persistent scheduling (SPS/SPT) service data packet, the data packet comprising first scheduling assignment (SA) information, the first SA information comprising SPS/SPT service cycle information; the first D2D device sends the data packet to a second D2D device. The first D2D device carries the SPS/SPT service cycle information in the SA information so that the second D2D device learns a resource usage situation in order to implement SPS/SPT service transmission with autonomous resource selection by the second D2D device, thereby preventing a plurality of D2D devices from simultaneously transmitting SPS/SPT service data on the same resources and thus producing conflicts.

18 Claims, 3 Drawing Sheets

(56) References Cited

U.S. PATENT DOCUMENTS

| | | | |
|---|---|---|---|
| 2015/0271807 A1 | 9/2015 | Patil et al. | |
| 2016/0095133 A1 | 3/2016 | Hwang et al. | |
| 2017/0245319 A1 | 8/2017 | Yasukawa et al. | |
| 2017/0273077 A1 | 9/2017 | Kim et al. | |
| 2018/0338319 A1 | 11/2018 | Kim et al. | |

FOREIGN PATENT DOCUMENTS

| | | | |
|---|---|---|---|
| CN | 104811892 A | 7/2015 | |
| CN | 105309038 A | 2/2016 | |
| JP | 2015521406 A | 7/2015 | |
| WO | 2015170766 A1 | 11/2015 | |
| WO | 2015178630 A1 | 11/2015 | |
| WO | 2016021949 A1 | 2/2016 | |

OTHER PUBLICATIONS

Written Opinion of the International Search Authority PCT/CN2016/081714, dated Jan. 25, 2017.
ZTE. "R1-162411: Discussion on SA Content", 3GPP TSG RAN WG1 Meeting #84bis, Apr. 15, 2016 (Apr. 15, 2016), section 2.1.;4 pages.
OPPO: "Discussion on the SPS configuration", 3GPP Draft; R1-162340, 3rd Generation Partnership Project (3GPP), vol. RAN WG1, No. Busan, Korea; Apr. 11, 2016-Apr. 15, 2016 Apr. 1, 2016, XP051079558.; 2 pages.
Panasonic: "Discussion on resource allocation mechanism in V2X", 3GPP Draft; R1-156963, 3rd Generation Partnership Project (3GPP), vol. RAN WG1, Meetging #83 Anaheim, USA; Nov. 15, 2015-Nov. 22, 2015; Nov. 6, 2015 (Nov. 6, 2015), XP051041993.; 3 pages.
Panasonic: "Discussion on SPS mechanism supported in V2V", 3GPP Draft; R1-160722, 3rd Generation Partnership Project (3GPP), vol. RAN WG1, Meeting #84; St Julian's, Malta; Feb. 15, 2016-Feb. 19, 2016 Feb. 15-19, 2016; XP051063871; 3 pages.
OPPO: "Discussion on SPS Enhancements for V2V",3GPP Draft; R2-162197—Discussion on SPS Enhancements for V2V, 3rd Generation Partnership Project (3GPP), vol. RAN WG2; Meeting #93bis; Dubrovnik, Croatia; Apr. 11, 2016-Apr. 15, 2016 Apr. 11-15, 2016; XP051082002; 3 pages.
Guangdong OPPO Mobile Telecom: "Discussion on the SPS configuration for mode-2", 3GPP Draft; R1-164468, 3rd Generation Partnership Project (3GPP), vol. RAN WG1, Meeting #85; Nanjing, China May 23, 2016-May 27, 2016 May 13, 2016 (May 13, 2016), XP051096903; 2 pages.
Supplementary European Search Report; Appln. No. 16901261.4, dated Oct. 25, 2018.
ZTE, Discussion on V2V SPS resource scheme [online], 3GPP TSG-RAN WG1#84b R1-162413, Apr. 11, 2016; 6 pages.
First Office Action of the Chinese application No. 201680083115.9, dated Mar. 16, 2020.
First Office Action of the Japanese application No. 2018-550346, dated Dec. 6, 2019.
Second Office Action of the Chinese application No. 201680083115.9, dated Jul. 21, 2020.
Office Action of the Indian application No. 201817037752, dated Jun. 25, 2020.
First Office Action of the Brazilian application No. BR1120180716499, dated Sep. 8, 2020.
Intel Corporation, "On Sensing Design Details for Sidelink V2V Communication", 3GPP TSG RAN WG1 Meeting #84bis R1-162363, Busan, Korea Apr. 11-15, 2016; 10 pages.
Decision of Refusal of the Japanese application No. 2018-550346, dated Sep. 25, 2020.
First Office Action of the Taiwanese application No. 106115187, dated Jan. 28, 2021.
First Office Action of the European application No. 16901261.4, dated Feb. 25, 2021.
Notice of Re-examination of the Taiwanese application No. 106115187, dated Jul. 27, 2021.
First Office Action of the U.S. Appl. No. 16/095,770, dated Jan. 12, 2021.
Notice of Allowance of the U.S. Appl. No. 16/095,770, dated May 28, 2021.
Notice of Corrected Allowance of the U.S. Appl. No. 16/095,770, dated Jun. 30, 2021.
First Office Action after Re-examination of the Japanese application No. 2018-550346, dated Sep. 24, 2021.

DEVICE-TO-DEVICE (D2D) COMMUNICATION METHOD AND D2D DEVICE

TECHNICAL FIELD

Embodiments of the disclosure relate to the field of wireless communication, and more particularly to methods for Device to Device (D2D) communication and D2D devices.

BACKGROUND

During evolution of the wireless communication technology oriented to a 5-Generation (5G) mobile phone mobile communication standard, on one hand, a conventional wireless communication performance index, for example, a network capability and spectral efficiency, is required to be continuously improved to further increase a utilization rate of limited and increasingly scarce wireless spectrums; and on the other hand, richer communication modes and resulting improvements in user experiences of terminals and extension of cellular communication applications also become an evolution direction to be considered. As a key candidate technology oriented to 5G, D2D communication has the potential prospect of improving system performance, improving a user experience and extending a cellular communication application and attracts extensive attentions.

D2D communication is a technology for direct communication between devices. Compared with the conventional cellular communication technology, the D2D communication has the advantage that D2D devices may directly communicate with each other and transmit data without relaying by means of a base station, and is called PCS-interface-based communication. In a PCS-interface-based communication manner, the D2D devices have two working modes: in mode 1, a resource for communication between the D2D devices is completely allocated by a base station; and in mode 2, the D2D devices may autonomously select a resource.

Semi-Persistent-Scheduling (SPS) means that, in a scheduling transmission process of Long Term Evolution (LTE), a base station allocates a periodic semi-persistent resource to a terminal and then the terminal may periodically transmit and receive service data on the same radio resource. At this time, SPS may adopt Semi-Persistent-Transmission (SPT), that is, transmission is performed on the semi-persistent resource periodically. The SPS/SPT manner may be activated (started) or released (stopped) by the base station, and when the terminal works in the SPS/SPT manner, the base station may also regulate the period and the used resource for an SPS/SPT service of the terminal.

After the SPS/SPT manner is introduced into D2D communication, for D2D devices working in the mode 1, a resource may be allocated to the D2D devices by a base station. However, for D2D devices working in the mode 2, since the D2D devices may autonomously select a resource for data transmission, the base station does not participate in resource scheduling, and at this time, a D2D device may not acquire a resource usage condition of other D2D device(s) and then may use the same resource as used by the other D2D device(s) for data transmission, thus causing a conflict.

SUMMARY

The disclosure provides methods for D2D communications and D2D devices, so as to solve the problem that a D2D device (which may be a second D2D device) which autonomously selects a resource may not learn about a resource usage condition of another D2D device (which may be a first D2D device).

According to a first aspect, the application provides a method for D2D communication, which may include the following operations. A first D2D device generates a data packet, the data packet being a data packet of an SPS/SPT service, the data packet including first Scheduling Assignment (SA) information and the first SA information including information of a period of the SPS service or the SPT service. The first D2D device transmits the data packet to a second D2D device.

The first D2D device carries the information of the period of the SPS service or the SPT service in the SA information, so that the second D2D device may learn about a usage condition of a resource to implement transmission of the SPS service or the SPT service in the case that the second D2D device autonomously selects the resource. Therefore, a conflict caused by simultaneous SPS/SPT service data transmission of multiple D2D devices on the same resource is avoided.

In combination with the first aspect, in a possible implementation mode of the first aspect, the first SA information may further include indication information, and the indication information may be used to indicate a number of times for which untransmitted data in the SPS service or the SPT service is to be transmitted.

The first D2D device carries the indication information in the SA information, so that the second D2D device may learn about the number of times for which the untransmitted data in the SPS service or the SPT service is to be transmitted, to determine a more detailed usage condition of the resource for transmission of the SPS service or the SPT service.

In combination with the first aspect or any one of the abovementioned implementation mode thereof, in a possible implementation mode of the first aspect, the first SA information may further include a process identifier (ID) of the SPS service or the SPT service.

The first D2D device carries the process ID of the SPS service or the SPT service in the SA information, so that the second D2D device may correspond an SPS/SPT parameter (for example, a period of the SPS service or the SPT service and the number of times for which the untransmitted data in the SPS service or the SPT service is to be transmitted) to the SPS service or the SPT service, and accuracy of learning about the usage condition of the resource is improved.

In combination with the first aspect or any one of the abovementioned implementation modes thereof, in a possible implementation mode of the first aspect, the process ID may be randomly generated by the first D2D device.

The process ID may be randomly generated by the first D2D device, so that a probability that the same process ID is used for different SPS/SPT services of different first D2D device is reduced, and accuracy of corresponding, by the second D2D device, the SPS/SPT parameter to the SPS service or the SPT service is improved.

In combination with the first aspect or any one of the abovementioned implementation modes thereof, in a possible implementation mode of the first aspect, a field for the information of the period or the indication information may include a reserved value, and the reserved value may be used to indicate the SPS service or the SPT service to be terminated.

The reserved value is added to the field for the information of the period or the indication information, so that the second D2D device may learn about whether the present SPS/SPT service is terminated and further learn about the usage condition of the resource for transmission of the SPS service or the SPT service.

In combination with the first aspect or any one of the abovementioned implementation modes thereof, in a possible implementation mode of the first aspect, an information bit reserved in the first SA information may include a reserved value, and the reserved value may be used to indicate terminating the SPS service or the SPT service.

The reserved value is added to the information bit reserved in the first SA information, so that the second D2D device may learn about whether the present SPS/SPT service is terminated and further learn about the usage condition of the resource for transmission of the SPS service or the SPT service.

In combination with the first aspect or any one of the abovementioned implementation modes thereof, in a possible implementation mode of the first aspect, the data packet may be transmitted at a transmitting moment t, and the method may further include that: the first D2D device transmits second SA information at a first moment, the first moment being any moment before the transmitting moment t and the second SA information being used to indicate that the first D2D device will transmit the data packet at the transmitting moment t.

The first D2D device transmits the second SA information at the first moment, so that another D2D device (which may be the second D2D device) newly joining a resource pool may accurately learn about the usage condition of the resource.

In combination with the first aspect or any one of the abovementioned implementation modes thereof, in a possible implementation mode of the first aspect, the first moment may be a moment t−a, wherein a may be a moment when the first D2D device that will transmit the data packet at the transmitting moment t starts detecting a usage condition of a resource pool.

The first D2D device transmits the second SA information at the moment t−a, so that another D2D device (which may be the second D2D device) newly joining the resource pool may accurately learn about the usage condition of the resource.

In combination with the first aspect or any one of the abovementioned implementation modes thereof, in a possible implementation mode of the first aspect, a bit corresponding to the information of the period may be valued to be 0 to indicate that a currently transmitted service is not an SPS/SPT service.

The bit corresponding to the information of the period is valued to be 0 to indicate that the currently transmitted service is not an SPS/SPT service, so that the second D2D device may learn about whether the service currently transmitted by the first D2D device is an SPS/SPT service or not and may learn about the usage condition of the resource more specifically.

According to a second aspect, the application provides a method for D2D communication, which may include the following operations. A second D2D device receives a data packet from a first D2D device, the data packet being a data packet of an SPS/SPT service, the data packet including first SA information, and the first SA information including information of a period of the SPS service or the SPT service. The second D2D device acquires the first SA information from the data packet. The second D2D device acquires the information of the period of the SPS service or the SPT service from the first SA information.

The first D2D device carries the information of the period of the SPS service or the SPT service in the SA information, so that the second D2D device may learn about a usage condition of a resource to implement transmission of the SPS service or the SPT service in the case that the second D2D device autonomously selects the resource. Therefore, a conflict caused by simultaneous SPS/SPT service data transmission of multiple D2D devices on the same resource is avoided.

In combination with the second aspect, in a possible implementation mode of the second aspect, the first SA information may further include indication information, and the indication information may be used to indicate a number of times for which untransmitted data in the SPS service or the SPT service is to be transmitted.

The first D2D device carries the indication information in the SA information, so that the second D2D device may learn about the number of times for which the untransmitted data in the SPS service or the SPT service is required to be transmitted, to determine a more detailed usage condition of the resource for transmission of the SPS service or the SPT service.

In combination with the second aspect or any one of the abovementioned implementation mode thereof, in a possible implementation mode of the second aspect, the first SA information may further include a process ID of the SPS service or the SPT service.

The first D2D device carries the process ID of the SPS service or the SPT service in the SA information, so that the second D2D device may correspond an SPS/SPT parameter (for example, a period of the SPS service or the SPT service and the number of times for which the untransmitted data in the SPS service or the SPT service is to be transmitted) to the SPS service or the SPT service, and accuracy of learning about the usage condition of the resource is improved.

In combination with the second aspect or any one of the abovementioned implementation mode thereof, in a possible implementation mode of the second aspect, the process ID may be randomly generated by the first D2D device.

The process ID may be randomly generated by the first D2D device, so that a probability that the same process ID is used for different SPS/SPT services of different first D2D device is reduced, and accuracy of corresponding, by the second D2D device, the SPS/SPT parameter to the SPS service or the SPT service is improved.

In combination with the second aspect or any abovementioned implementation modes thereof, in a possible implementation mode of the second aspect, a field for the information of the period or the indication information may include a reserved value, and the reserved value may be used to indicate terminating the SPS service or the SPT service.

The reserved value is added to the field for the information of the period or the indication information, so that the second D2D device may learn about whether the present SPS/SPT service is terminated and further learn about the usage condition of the resource for transmission of the SPS service or the SPT service.

In combination with the second aspect or any abovementioned implementation modes thereof, in a possible implementation mode of the second aspect, an information bit reserved in the first SA information may include a reserved value, and the reserved value may be used to indicate terminating the SPS service or the SPT service.

The reserved value is added to the information bit reserved in the first SA information, so that the second D2D device may learn about whether the present SPS/SPT service is terminated and further learn about the usage condition of the resource for transmission of the SPS service or the SPT service.

In combination with the second aspect or any one of the abovementioned implementation modes thereof, in a possible implementation mode of the second aspect, the data packet may be transmitted at a transmitting moment t, and the method may further include that, the second D2D device receives second SA information from the first D2D device at a first moment, the first moment being any moment before the transmitting moment t and the second SA information being used to indicate that the first D2D device will transmit the data packet at the transmitting moment t.

The first D2D device transmits the second SA information at the first moment, so that another D2D device (which may be the second D2D device) newly joining a resource pool may accurately learn about the usage condition of the resource.

In combination with the second aspect or any one of the abovementioned implementation modes thereof, in a possible implementation mode of the second aspect, the first moment may be a moment t−a, where a may be a moment when the first D2D device that will transmit the data packet at the transmitting moment t starts detecting a usage condition of a resource pool.

The first D2D device transmits the second SA information at the moment t−a, so that another D2D device (which may be the second D2D device) newly joining the resource pool may accurately learn about the usage condition of the resource.

In combination with the second aspect or any one of the abovementioned implementation modes thereof, in a possible implementation mode of the second aspect, a bit corresponding to the information of the period may be valued to be 0 to indicate that a currently transmitted service is not an SPS/SPT service.

The bit corresponding to the information of the period is valued to be 0 to indicate that the currently transmitted service is not an SPS/SPT service, so that the second D2D device may learn about whether the service currently transmitted by the first D2D device is an SPS/SPT service and may learn about the usage condition of the resource more specifically.

According to a third aspect, the application provides D2D device, which may be first D2D device and include a generation module and a first transmitting module. The generation module is configured to generate a data packet, the data packet being a data packet of an SPS/SPT service, the data packet including first SA information and the first SA information including information of a period of the SPS service or the SPT service. The first transmitting module is configured to transmit the data packet to a second D2D device.

The first D2D device carries the information of the period of the SPS service or the SPT service in the SA information, so that the second D2D device may learn about a usage condition of a resource to implement transmission of the SPS service or the SPT service in the case that the second D2D device autonomously selects the resource. Therefore, a conflict caused by simultaneous SPS/SPT service data transmission of multiple D2D devices on the same resource is avoided.

In combination with the third aspect, in a possible implementation mode of the third aspect, the first SA information may further include indication information, and the indication information may be used to indicate a number of times for which untransmitted data in the SPS service or the SPT service is to be transmitted.

The first D2D device carries the indication information in the SA information, so that the second D2D device may learn about the number of times for which the untransmitted data in the SPS service or the SPT service is to be transmitted, to determine a more detailed usage condition of the resource for transmission of the SPS service or the SPT service.

In combination with the third aspect or any one of the abovementioned implementation mode thereof, in a possible implementation mode of the third aspect, the first SA information may further include a process ID of the SPS service or the SPT service.

The first D2D device carries the process ID of the SPS service or the SPT service in the SA information, so that the second D2D device may correspond an SPS/SPT parameter (for example, a period of the SPS service or the SPT service and the number of times for which the untransmitted data in the SPS service or the SPT service is to be transmitted) to the SPS service or the SPT service, and accuracy of learning about the usage condition of the resource is improved.

In combination with the third aspect or any one of the abovementioned implementation mode thereof, in a possible implementation mode of the third aspect, the process ID may be randomly generated by the first D2D device.

The process ID may be randomly generated by the first D2D device, so that a probability that the same process ID is used for different SPS/SPT services of different first D2D device is reduced, and accuracy of corresponding, by the second D2D device, the SPS/SPT parameter to the SPS service or the SPT service is improved.

In combination with the third aspect or any abovementioned implementation modes thereof, in a possible implementation mode of the third aspect, a field for the information of the period or the indication information may include a reserved value, and the reserved value may be used to indicate terminating the SPS service or the SPT service.

The reserved value is added to the field for the information of the period or the indication information, so that the second D2D device may learn about whether the present SPS/SPT service is terminated and further learn about the usage condition of the resource for transmission of the SPS service or the SPT service.

In combination with the third aspect or any abovementioned implementation modes thereof, in a possible implementation mode of the third aspect, an information bit reserved in the first SA information may include a reserved value, and the reserved value may be used to indicate terminating the SPS service or the SPT service.

The reserved value is added to the information bit reserved in the first SA information, so that the second D2D device may learn about whether the present SPS/SPT service is terminated and further learn about the usage condition of the resource for transmission of the SPS service or the SPT service.

In combination with the third aspect or any one of the abovementioned implementation modes thereof, in a possible implementation mode of the third aspect, the data packet may be transmitted at a transmitting moment t, and the D2D device may further include a second transmitting module, configured to transmit second SA information at a first moment, the first moment being any moment before the transmitting moment t and the second SA information being used to indicate that the first D2D device will transmit the data packet at the transmitting moment t.

The first D2D device transmits the second SA information at any moment before the transmitting moment t for the data packet, so that another D2D device (which may be the second D2D device) newly joining a resource pool may accurately learn about the usage condition of the resource.

In combination with the third aspect or any one of the abovementioned implementation modes thereof, in a possible implementation mode of the third aspect, the first moment may be a moment t−a, where a may be a moment when the first D2D device that will transmit the data packet at the transmitting moment t starts detecting a usage condition of a resource pool.

The first D2D device transmits the second SA information at the moment t−a, so that another D2D device (which may be the second D2D device) newly joining the resource pool may accurately learn about the usage condition of the resource.

In combination with the third aspect or any one of the abovementioned implementation modes thereof, in a possible implementation mode of the third aspect, a bit corresponding to the information of the period may be valued to be 0 to indicate that a currently transmitted service is not an SPS/SPT service.

The bit corresponding to the information of the period is valued to be 0 to indicate that the currently transmitted service is not an SPS/SPT service, so that the second D2D device may learn about whether the service currently transmitted by the first D2D device is an SPS/SPT service and may learn about the usage condition of the resource more specifically.

According to a fourth aspect, the disclosure provides a D2D device, which may be a second D2D device and include: a first receiving module, a first acquisition module, and a second acquisition module. The first receiving module is configured to receive a data packet from a first D2D device, the data packet being a data packet of an SPS/SPT service, the data packet including first SA information and the first SA information including information of a period of the SPS service or the SPT service. The first acquisition module is configured to acquire the first SA information from the data packet received by the first receiving module. The second acquisition module is configured to acquire the information of the period of the SPS service or the SPT service from the first SA information acquired by the first acquisition module.

The first D2D device carries the information of the period of the SPS service or the SPT service in the SA information, so that the second D2D device may learn about a usage condition of a resource to implement transmission of the SPS service or the SPT service in the case that the second D2D device autonomously selects the resource. Therefore, a conflict caused by simultaneous SPS/SPT service data transmission of multiple D2D devices on the same resource is avoided.

In combination with the fourth aspect, in a possible implementation mode of the fourth aspect, the first SA information may further include indication information, and the indication information may be used to indicate a number of times for which untransmitted data in the SPS service or the SPT service is to be transmitted.

The first D2D device carries the indication information in the SA information, so that the second D2D device may learn about the number of times for which the untransmitted data in the SPS service or the SPT service is to be transmitted, to determine a more detailed usage condition of the resource for transmission of the SPS service or the SPT service.

In combination with the fourth aspect or any one of the abovementioned implementation mode thereof, in a possible implementation mode of the fourth aspect, the first SA information may further include a process ID of the SPS service or the SPT service.

The first D2D device carries the process ID of the SPS service or the SPT service in the SA information, so that the second D2D device may correspond an SPS/SPT parameter (for example, a period of the SPS service or the SPT service and the number of times for which the untransmitted data in the SPS service or the SPT service is to be transmitted) to the SPS service or the SPT service, and accuracy of learning about the usage condition of the resource is improved.

In combination with the fourth aspect or any one of the abovementioned implementation mode thereof, in a possible implementation mode of the fourth aspect, the process ID may be randomly generated by the first D2D device.

The process ID may be randomly generated by the first D2D device, so that a probability that the same process ID is used for different SPS/SPT services of different first D2D device is reduced, and accuracy of corresponding, by the second D2D device, the SPS/SPT parameter to the SPS service or the SPT service is improved.

In combination with the fourth aspect or any abovementioned implementation modes thereof, in a possible implementation mode of the fourth aspect, a field for the information of the period or the indication information may include a reserved value, and the reserved value may be used to indicate terminating the SPS service or the SPT service.

The reserved value is added to the field for the information of the period or the indication information, so that the second D2D device may learn about whether the present SPS/SPT service is terminated and further learn about the usage condition of the resource for transmission of the SPS service or the SPT service.

In combination with the fourth aspect or any abovementioned implementation modes thereof, in a possible implementation mode of the fourth aspect, an information bit reserved in the first SA information may include a reserved value, and the reserved value may be used to indicate terminating the SPS service or the SPT service.

The reserved value is added to the information bit reserved in the first SA information, so that the second D2D device may learn about whether the present SPS/SPT service is terminated or not and further learn about the usage condition of the resource for transmission of the SPS service or the SPT service.

In combination with the fourth aspect or any one of the abovementioned implementation modes thereof, in a possible implementation mode of the fourth aspect, the data packet may be transmitted at a transmitting moment t, and the D2D device may further include a second receiving module, configured to receive second SA information from the first D2D device at a first moment, the first moment being any moment before the transmitting moment t and the second SA information being used to indicate that the first D2D device will transmit the data packet at the transmitting moment t.

The first D2D device transmits the second SA information at the first moment, so that another D2D device newly joining a resource pool may accurately learn about the usage condition of the resource.

In combination with the fourth aspect or any one of the abovementioned implementation modes thereof, in a possible implementation mode of the fourth aspect, the first moment may be a moment t−a, where a may be a moment when the first D2D device that will transmit the data packet at the transmitting moment t starts detecting a usage condition of a resource pool.

The first D2D device transmits the second SA information at the moment t−a, so that another D2D device newly joining the resource pool may accurately learn about the usage condition of the resource.

In combination with the fourth aspect or any one of the abovementioned implementation modes thereof, in a possible implementation mode of the fourth aspect, a bit corresponding to the information of the period may be valued to be 0 to indicate that a currently transmitted service is not an SPS/SPT service.

The bit corresponding to the information of the period is valued to be 0 to indicate that the currently transmitted service is not an SPS/SPT service, so that the second D2D device may learn about whether the service currently transmitted by the first D2D device is an SPS/SPT service and may learn about the usage condition of the resource more specifically.

According to a fifth aspect, the application provides a D2D device, which is a first D2D device and includes a memory, a processor, an input/output interface, a communication interface and a bus system. The memory, the processor, the input/output interface and the communication interface are connected through the system bus. The memory is configured to store instructions. The processor is configured to execute the instructions stored in the memory, and when the instructions are executed, the processor executes the method according to the first aspect through the communication interface and controls the input/output interface to receive input data and information and output data such as an operation result.

According to a sixth aspect, the application provides a D2D device, which is a second D2D device and includes a memory, a processor, an input/output interface, a communication interface and a bus system. The memory, the processor, the input/output interface and the communication interface are connected through the system bus. The memory is configured to store instructions. The processor is configured to execute the instructions stored in the memory, and when the instructions are executed, the processor executes the method according to the second aspect through the communication interface and controls the input/output interface to receive input data and information and output data such as an operation result.

According to a seventh aspect, the application provides a computer-readable storage medium, which is configured to store a program code for D2D communication, the program code being configured to execute method instructions in the first aspect.

According to an eighth aspect, the application provides a computer-readable storage medium, which is configured to store a program code for D2D communication, the program code being configured to execute method instructions in the second aspect.

The application provides a method for D2D communication and to D2D device, so as to enable the D2D device (which may be the second D2D device) which autonomously selects a resource to learn about a resource usage condition of another D2D device (which may be the first D2D device) to implement transmission of an SPS/SPT service.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skilled in the art according to these drawings without creative work.

DETAILED DESCRIPTION

It should be understood that the technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an Advanced Long Term Evolution (LTE-A) system, a Universal Mobile Telecommunication System (UMTS) and 5G.

It should also be understood that, in the embodiments of the disclosure, a D2D device (which may be the abovementioned first D2D device and/or the abovementioned second D2D device) includes, but not limited to, a User Equipment (UE), a Mobile Station (MS), a mobile terminal, a mobile telephone, a handset, a portable device and the like. The UE may communicate with one or more core networks through a Radio Access Network (RAN). For example, the UE may be a mobile telephone (or called a "cell" phone), a computer with a wireless communication function and the like, or the UE may be a portable, pocket, handheld, computer-embedded or vehicle-mounted mobile device.

In some embodiments, D2D communication may be Vehicle to Vehicle (V2V) communication or Vehicle to X (V2X) communication. In V2X communication, X may generally be any device with a wireless receiving and transmitting capability, for example, but not limited to, a wireless device moving at a low speed, a vehicle-mounted device moving at a high speed or a network control node with a wireless transmitting and receiving capability.

In the embodiments of the disclosure, a base station may be a Base Transceiver Station (BTS) in the GSM or CDMA, or may be a NodeB in WCDMA, or may be an Evolved Node B (eNB or e-NodeB) in LTE, or may be an access point configured to provide an access service in 5G. There are no limits made in the embodiments of the disclosure.

Figure 1:
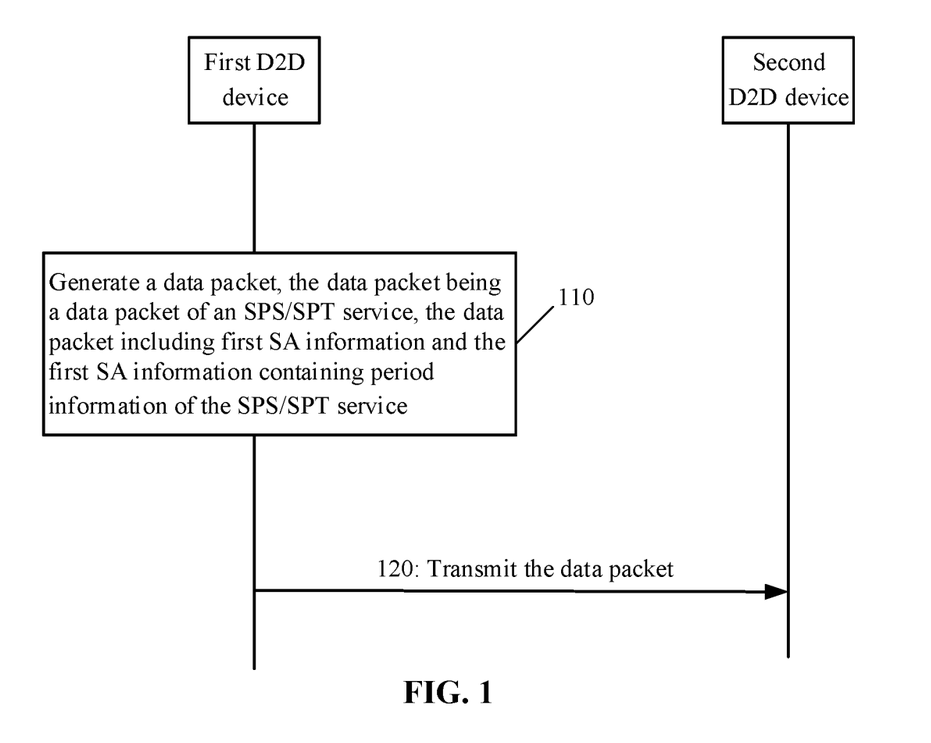
FIG. 1 illustrates a schematic flowchart of a method for D2D communication according to an embodiment of the disclosure.

FIG. 1 illustrates a schematic flowchart of a method for D2D communication according to an embodiment of the disclosure. The method illustrated in in FIG. 1 includes the following operations.

In 110, a first D2D device generates a data packet, the data packet being a data packet of an SPS/SPT service, the data packet including first SA information and the first SA information containing information of a period of the SPS service or the SPT service.

Specifically, the first SA information may be used to indicate information such as time-frequency resource information of data transmitted by the first D2D device, Modulation and Coding Scheme (MCS) information, a frequency hopping indication, Timing Advance (TA) and a receiving group ID. The time-frequency resource information of the data may indicate a subframe occupied for transmission of the data in form of a Time Resource Pattern (T-RPT).

It should be understood that the information of the period of the SPS service or the SPT service may be a time interval at which the data packets of the SPS service or the SPT service are transmitted, i.e., a period of the SPS service or the SPT service, or may be an index of a period set, that is, the period set, for example, {0, 10 ms, 20 ms, 40 ms, 100 ms, 200 ms}, may be pre-configured by a protocol and the information of the period may be an index of the set. For example, an index 1 corresponds to 10 ms in the period set, and the period of the SPS service or the SPT service is 10 ms. A representation form for the information of the period will not be specifically limited in the disclosure.

It should also be understood that, when the information of the period is the period of the service, the period may be valued to be 0 to indicate that the current service is not an SPS/SPT service.

It should also be understood that the second D2D device may be a D2D device performing D2D communication with the first D2D device, the first D2D device may be a transmitting end for transmission of the data packets of the SPS/SPT service and the second D2D device may be a receiving end for transmission of the data packet of the SPS/SPT service.

It should further be understood that the second D2D device may be a D2D device or may be multiple D2D devices, which will not be specifically limited in the disclosure.

Alternatively, in an embodiment, the first SA information further includes indication information for indicating a number of times for which untransmitted data in the SPS service or the SPT service is to be transmitted.

Specifically, a bit corresponding to the indication information may be valued to be 0 to indicate that the current service is not an SPS/SPT service.

Alternatively, in an embodiment, the first SA information further includes a process ID of the SPS service or the SPT service.

Specifically, there may be multiple SPS/SPT services for one first D2D device, or there may be multiple different SPS/SPT services for different D2D devices, each SPS/SPT service may correspond to a process ID, and when an SPS/SPT parameter (for example, a period or the number of times for which untransmitted data is to be transmitted) for a certain SPS/SPT service is to be changed, the process ID may enable the second D2D device to correspond the SPS/SPT parameter to the specific SPS/SPT service.

It should be understood that the process ID may be a value randomly selected by the first D2D device to reduce a probability that different terminals generate the same process ID. The selection manner for the process ID will not be specifically limited in the disclosure.

Alternatively, in an embodiment, a field for the information of the period or the indication information includes a reserved value for indicating terminating the SPS service or the SPT service.

Specifically, when the current SPS/SPT service changes, the reserved value included in the information of the period or the indication information may indicate that any subsequent data packet of the SPS service or the SPT service corresponding to the process ID will not be transmitted and may also indicate that any subsequent data packet of the SPS service or the SPT service corresponding to this SA will also not be transmitted.

It should be understood that the reserved value may alternatively be set in the SA information. A dedicated information bit (alternatively, a bit), for example, 1 bit, may be reserved in the SA information to indicate the reserved value. A storage location of the reserved value will not be specifically limited in the disclosure.

Specifically, the reserved value may be used to indicate terminating the SPS service or the SPT service when the SPS/SPT parameter (for example, the information of the period and/or the indication information) of the SPS service or the SPT service changes.

Since the process ID may be randomly selected by the first D2D device, it cannot be ensured that process IDs selected by different first D2D devices are different from each other. For avoiding using the same process ID for different SPS/SPT services of different terminals, which makes it impossible for the second D2D device to correspond the changed SPS/SPT parameter to the SPS service or the SPT service, the first D2D device may transmit third SA information before changing the present SPS/SPT parameter, the third SA information being used to indicate terminating transmission of a data packet of an SPS/SPT service corresponding to the third SA information.

It should be understood that the third SA information may include all or at least part of information of the first SA information, which will not be specifically limited in the disclosure.

It is important to note that the second D2D device learns about that a resource corresponding to the third SA information is released after receiving the third SA information, and at this time, the second D2D device may transmit another SPS/SPT service on the resource, or the first D2D device transmitting the third SA information may transmit a new SPS/SPT service on the resource.

In 120, the first D2D device transmits the data packet to a second D2D device.

The first D2D device may carry the information of the period of the SPS service or the SPT service in the SA information, so that the second D2D device may learn about a usage condition of a resource to implement transmission of the SPS service or the SPT service in the case that the second D2D device autonomously selects the resource. Therefore, a conflict caused by simultaneous SPS/SPT service data transmission of multiple D2D devices on the same resource is avoided.

Alternatively, in an embodiment, the data packet is to be transmitted a transmitting moment t, and the method further includes that, the first D2D device transmits second SA information at a first moment, the first moment being any moment before the transmitting moment t and the second SA information being used to indicate that the first D2D device will transmit the data packet at the transmitting moment t.

It should be understood that the second SA information may further include all contents or part of contents in the first SA information and contents of the second SA information will not be specifically limited in the disclosure.

Alternatively, in an embodiment, the first moment is a moment t−a, where a is a moment when the first D2D device that will transmit the data packet at the transmitting moment t starts detecting a usage condition of a resource pool.

Under a normal condition, if the first D2D device will transmit the data at the moment t, the first D2D device is at least required to start determining the usage condition of the resource at a moment between $[t-a, t-]$, where $a>b\leq 0$, $t-a$ represents time when the first D2D device starts detection for determining whether the resource is idle, t−b represents time when the first D2D device ends detection for determining whether the resource is idle, and all the D2D devices (including the first D2D device and the second D2D device) have a same value of a and a same value of b.

If the period of the SPS service or the SPT service of the first D2D device is $t_1$>a and the first D2D device will transmit the data packet of the SPS service or the SPT service at the moment t, a previous data packet and next data packet of the data packet are transmitted at a moment $t-t_1$ and a moment $t+t_1$ respectively. At this moment, if a D2D device newly joining the resource pool is also going to transmit a data packet at the moment t, a moment when the D2D device newly joining the resource pool starts determining whether the resource is idle at first is t−a, and since the previous data packet of the first D2D device is transmitted at the moment $t-t_1$, the D2D device newly joining the resource pool may not learn at this moment about that the first D2D device will transmit the data packet at the moment t, and then there may be a conflict between the first D2D device and the D2D device newly joining the resource pool at the moment t.

For avoiding the abovementioned conflict, the D2D device in the embodiment of the disclosure may transmit the data packet including the first SA information at the moment only after transmitting the second SA information at the moment t−a.

Under a normal condition, if the first D2D device is going to select (or reselect) a resource for transmitting the data packet of the SPS service or the SPT service at the moment t, the first D2D device is at least required to start determining the usage condition of the resource at a moment between [t−a, t−b], where a>b≤0, t−a represents the time when the first D2D device starts detection for determining whether the resource is idle, t−b represents the time when the first D2D device ends detection for determining whether the resource is idle, and all the first D2D devices have the same value of a and the same value of b. The first D2D device may transmit the first SA information corresponding to the data packet of the SPS service or the SPT service at a moment t+c (c≤0 and is an integer) and transmit the data packet of the SPS service or the SPT service at a moment t+d (d≤c and is an integer). At this time, for ensuring that the newly joining D2D device may learn about the first SA information transmitted at the moment t+c and transmit the data packet (as mentioned above) of the SPS service or the SPT service at the moment t+d, it is necessary to transmit the second SA information at the moment t−a, then the first SA information may be transmitted at the moment t+c and the data packet of the SPS service or the SPT service may be transmitted at the moment t+d.

It is important to point out that, for the abovementioned two conditions, transmitting the second SA information between [t−a, t−b] may enable the D2D device newly joining the resource pool to which the first D2D device belongs to learn about the usage condition of the resource. Since the D2D device that will transmit the data packet of the SPS service or the SPT service at the moment t starts detection of whether the resource is idle at the moment t−a, the second SA information may be preferably transmitted at the moment t−a.

It should be understood that a, b, c, d and t may be in a unit of a subframe and are all integers. A duration of a subframe in LTE is 1 ms. The unit of a, b, c, d and t will not be specifically limited in the disclosure.

Alternatively, in an embodiment, a bit corresponding to the information of the period is valued to be 0 to indicate that the currently transmitted service is not an SPS/SPT service.

The method for D2D communication illustrated in in FIG. 1 according to the embodiments of the disclosure is described above in combination with FIG. 1 in detail, and communication device according to the embodiments of the disclosure will be described below in combination with FIG. 2 to FIG. 5 in detail. It should be understood that, for convenient and brief description, a specific working process of the D2D device during D2D communication may be seen from the corresponding process in the abovementioned method embodiment and will not be elaborated herein.

Figure 2:
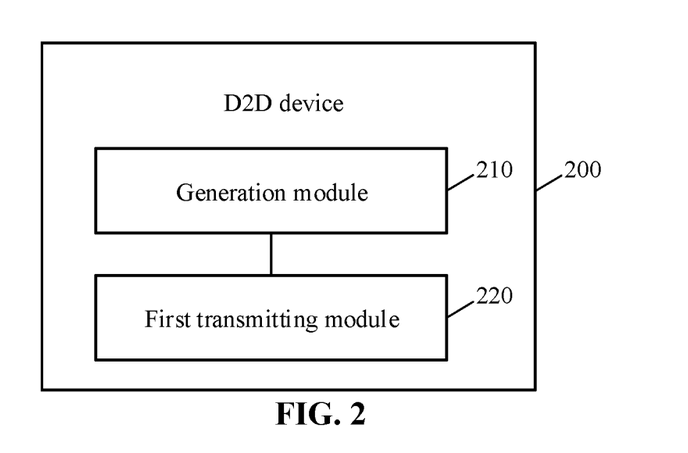
FIG. 2 illustrates a schematic block diagram of a D2D device according to an embodiment of the disclosure.

FIG. 2 illustrates a schematic block diagram of D2D device according to an embodiment of the disclosure. The D2D device illustrated in in FIG. 2 may be a first D2D device, and the D2D device 200 includes a generation module 210 and a first transmitting module 220.

The generation module 210 is configured to generate a data packet. The data packet is a data packet of an SPS/SPT service, the data packet includes first SA information, and the first SA information includes information of a period of the SPS service or the SPT service.

The first transmitting module 220 is configured to transmit the data packet generated by the generation module 210 to a second D2D device.

The first D2D device carries the information of the period of the SPS service or the SPT service in the SA information, so that the second D2D device may learn about a usage condition of a resource to implement transmission of the SPS service or the SPT service in the case that the second D2D device autonomously selects the resource.

Therefore, a conflict caused by simultaneous SPS/SPT service data transmission of multiple D2D devices on the same resource is avoided.

Alternatively, in an embodiment, the first SA information further includes indication information for indicating a number of times for which untransmitted data in the SPS service or the SPT service is to be transmitted.

Alternatively, in an embodiment, the first SA information further includes a process ID of the SPS service or the SPT service.

Alternatively, in an embodiment, the process number is randomly generated by the first D2D device.

Alternatively, in an embodiment, a field for the information of the period or the indication information includes a reserved value for indicating terminating the SPS service or the SPT service.

Alternatively, in an embodiment, an information bit reserved in the first SA information includes a reserved value for indicating terminating the SPS service or the SPT service.

Alternatively, in an embodiment, the data packet is to be transmitted a transmitting moment t. The D2D device further includes a second transmitting module, configured to transmit second SA information at a first moment. The first moment may be any moment before the transmitting moment t, and the second SA information may be used to indicate that the first D2D device will transmit the data packet at the transmitting moment t.

Alternatively, in an embodiment, the first moment is a moment t−a, where a is a moment when the first D2D device that will transmit the data packet at the transmitting moment t starts detecting a usage condition of a resource pool.

Alternatively, in an embodiment, a bit corresponding to the information of the period is valued to be 0 to indicate that the currently transmitted service is not an SPS/SPT service.

Figure 3:
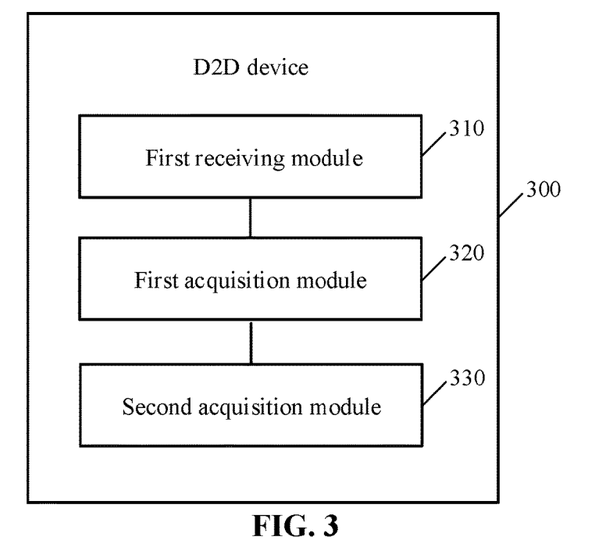
FIG. 3 illustrates a schematic block diagram of a D2D device according to another embodiment of the disclosure.

FIG. 3 illustrates a schematic block diagram of a D2D device according to another embodiment of the disclosure. The D2D device illustrated in FIG. 3 may be a second D2D device, and the D2D device 300 includes a first receiving module 310, a first acquisition module 320 and a second acquisition module 330.

The first receiving module 310 is configured to receive a data packet from a first D2D device. The data packet may be a data packet of an SPS/SPT service. The data packet includes first SA information, and the first SA information includes information of a period of the SPS service or the SPT service.

The first acquisition module 320 is configured to acquire the first SA information from the data packet received by the first receiving module 310.

The second acquisition module 330 is configured to acquire the information of the period of the SPS service or the SPT service from the first SA information acquired by the first acquisition module 320.

The first D2D device carries the information of the period of the SPS service or the SPT service in the SA information, so that the second D2D device may learn about a usage condition of a resource to implement transmission of the SPS service or the SPT service in the case that the second D2D device autonomously selects the resource. Therefore, a conflict caused by simultaneous SPS/SPT service data transmission of multiple D2D devices on the same resource is avoided.

Alternatively, in an embodiment, the first SA information further includes indication information for indicating a number of times for which untransmitted data in the SPS service or the SPT service is to be transmitted.

Alternatively, in an embodiment, the first SA information further includes a process ID of the SPS service or the SPT service.

Alternatively, in an embodiment, the process number is randomly generated by the first D2D device.

Alternatively, in an embodiment, a field for the information of the period or the indication information includes a reserved value for indicating terminating the SPS service or the SPT service.

Alternatively, in an embodiment, an information bit reserved in the first SA information includes a reserved value for indicating terminating the SPS service or the SPT service.

Alternatively, in an embodiment, the data packet is to be transmitted a transmitting moment t. The D2D device further includes a second receiving module, configured to receive second SA information from the first D2D device at a first moment. The first moment may be any moment before the transmitting moment t. The second SA information may be used to indicate that the first D2D device will transmit the data packet at the transmitting moment t.

Alternatively, in an embodiment, the first moment is a moment t−a, where a is a moment when the first D2D device that will transmit the data packet at the transmitting moment t starts detecting a usage condition of a resource pool.

Alternatively, in an embodiment, a bit corresponding to the information of the period is valued to be 0 to indicate that the currently transmitted service is not an SPS/SPT service.

Figure 4:
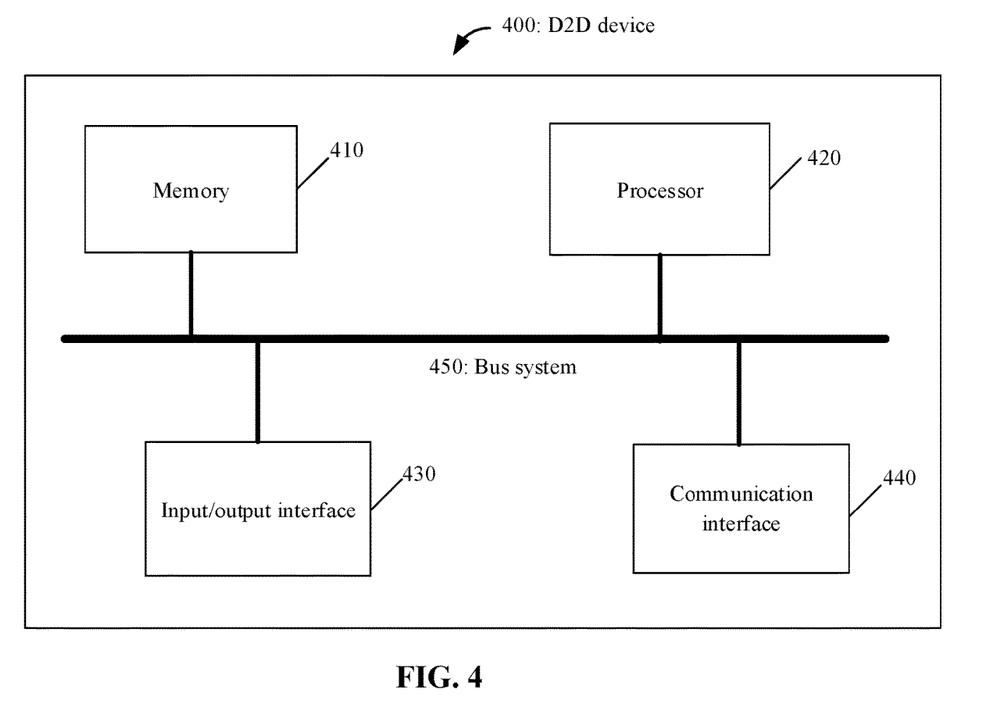
FIG. 4 illustrates a schematic block diagram of a D2D device according to another embodiment of the disclosure.

FIG. 4 illustrates a schematic block diagram of a D2D device according to another embodiment of the disclosure. The D2D device 400 illustrated in in FIG. 4 may be a first D2D device and includes a memory 410, a processor 420, an input/output interface 430, a communication interface 440 and a bus system 450. The memory 410, the processor 420, the input/output interface 430 and the communication interface 440 are connected through the bus system 450. The memory 410 is configured to store instructions. The processor 420 is configured to execute the instructions stored in the memory 410 to control the input/output interface 430 to receive input data and information and output data such as an operation result and control the communication interface 440 to transmit a signal.

The processor 420 is configured to generate a data packet. The data packet may be a data packet of an SPS/SPT service. The data packet may include first SA information, and the first SA information may include information of a period of the SPS service or the SPT service.

The communication interface 440 transmits the data packet to a second D2D device.

It should be understood that, in the embodiment of the disclosure, the processor 420 may adopt a universal Central Processing Unit (CPU), a microprocessor, an Application Specific Integrated Circuit (ASIC) or one or more integrated circuits, and is configured to execute a related program to implement the technical solution provided by the embodiment of the disclosure.

It should also be understood that the communication interface 440 uses, for example, but not limited to, a transceiver device such as a transceiver to implement communication between the D2D device 400 and another device or a communication network.

The memory 410 may include a Read-Only Memory (ROM) and a Random Access Memory (RAM) and provides instructions and data for the processor 420. A part of the memory 410 may further include a nonvolatile RAM. For example, the memory 410 may further store information of an device type.

The bus system 450 includes a data bus, and may further include a power bus, a control bus, a state signal bus and the like. However, for clear description, various buses in FIG. 4 are marked as the bus system 450.

In an implementation process, each operation of the method may be completed by an integrated logic circuit of hardware in the processor 420 or an instruction in a software form. The operations of the method for D2D communication disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 410, and the processor 420 reads information in the memory 410, and completes the operations of the method in combination with hardware. No more detailed descriptions will be made herein to avoid repetitions.

The first D2D device carries the information of the period of the SPS service or the SPT service in the SA information, so that the second D2D device may learn about a usage condition of a resource to implement transmission of the SPS service or the SPT service in the case that the second D2D device autonomously selects the resource. Therefore, a conflict caused by simultaneous SPS/SPT service data transmission of multiple D2D devices on the same resource is avoided.

Alternatively, in an embodiment, the first SA information further includes indication information for indicating a number of times for which untransmitted data in the SPS service or the SPT service is to be transmitted.

Alternatively, in an embodiment, the first SA information further includes a process ID of the SPS service or the SPT service.

Alternatively, in an embodiment, the process number is randomly generated by the D2D device.

Alternatively, in an embodiment, a field for the information of the period or the indication information includes a reserved value for indicating terminating the SPS service or the SPT service.

Alternatively, in an embodiment, an information bit reserved in the first SA information includes a reserved value for indicating terminating the SPS service or the SPT service.

Alternatively, in an embodiment, the data packet is to be transmitted a transmitting moment t. The communication interface 440 is further configured to transmit second SA information at a first moment. The first moment may be any moment before the transmitting moment t, and the second SA information may be used to indicate that the first D2D device will transmit the data packet at the transmitting moment t.

Alternatively, in an embodiment, the first moment is a moment t−a, where a is a moment when the first D2D device that will transmit the data packet at the moment t starts detecting a usage condition of a resource pool.

Alternatively, in an embodiment, a bit corresponding to the information of the period is valued to be 0 to indicate that the currently transmitted service is not an SPS/SPT service.

Figure 5:
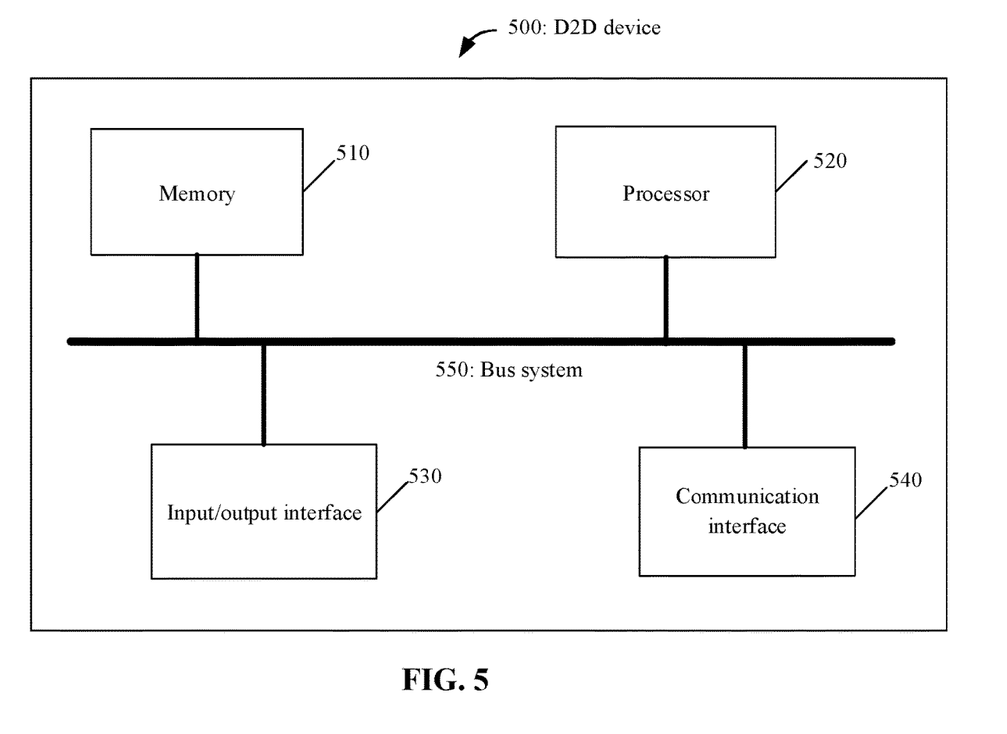
FIG. 5 illustrates a schematic block diagram of a D2D device according to another embodiment of the disclosure.

FIG. 5 illustrates a schematic block diagram of a D2D device according to another embodiment of the disclosure. The D2D device 500 illustrated in in FIG. 5 may be a second D2D device and includes: a memory 510, a processor 520, an input/output interface 530, a communication interface 540 and a bus system 550. The memory 510, the processor 520, the input/output interface 530 and the communication interface 540 are connected through the bus system 550. The memory 510 is configured to store instructions, and the processor 520 is configured to execute the instructions stored in the memory 520 to control the input/output interface 530 to receive input data and information and output data such as an operation result and control the communication interface 540 to transmit a signal.

The communication interface 540 is configured to receive a data packet from a first D2D device. The data packet is a data packet of an SPS/SPT service, the data packet includes first SA information and the first SA information including information of a period of the SPS service or the SPT service.

The processor 520 is configured to acquire the first SA information from the data packet.

The processor 520 is further configured to acquire the information of the period of the SPS service or the SPT service from the first SA information.

It should be understood that, in the embodiment of the disclosure, the processor 520 may adopt a universal CPU, a microprocessor, an ASIC or one or more integrated circuits, and is configured to execute a related program to implement the technical solution provided by the embodiment of the disclosure.

It should also be understood that the communication interface 540 uses, for example, but not limited to, a transceiver device such as a transceiver to implement communication between the D2D device 500 and other device or a communication network.

The memory 510 may include a ROM and a RAM and provides an instruction and data for the processor 520. A part of the memory 410 may further include a nonvolatile RAM. For example, the memory 410 may further store information of a device type.

The bus system 550 includes a data bus, and may further include a power bus, a control bus, a state signal bus and the like. However, for clear description, various buses in the figure are marked as the bus system 550.

In an implementation process, each operation of the method may be completed by an integrated logic circuit of hardware in the processor 520 or an instruction in a software form. The operations of the method for D2D communication disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 510, and the processor 520 reads information in the memory 510, and completes the operations of the method in combination with hardware. No more detailed descriptions will be made herein to avoid repetitions.

The first D2D device carries the information of the period of the SPS service or the SPT service in the SA information, so that the second D2D device may learn about a usage condition of a resource to implement transmission of the SPS service or the SPT service in the case that the second D2D device autonomously selects the resource. Therefore, a conflict caused by simultaneous SPS/SPT service data transmission of multiple D2D devices on the same resource is avoided.

Alternatively, in an embodiment, the first SA information further includes indication information for indicating a number of times for which untransmitted data in the SPS service or the SPT service is to be transmitted.

Alternatively, in an embodiment, the first SA information further includes a process ID of the SPS service or the SPT service.

Alternatively, in an embodiment, the process number is randomly generated by the first D2D device.

Alternatively, in an embodiment, a field for the information of the period or the indication information includes a reserved value for indicating terminating the SPS service or the SPT service.

Alternatively, in an embodiment, an information bit reserved in the first SA information includes a reserved value for indicating terminating the SPS service or the SPT service.

Alternatively, in an embodiment, the data packet is to be transmitted a transmitting moment t. The communication interface 540 is further configured to receive second SA information from the first D2D device at a first moment. The first moment may be any moment before the transmitting moment t, and the second SA information may be used to indicate that the first D2D device will transmit the data packet at the transmitting moment t.

Alternatively, in an embodiment, the first moment is a moment t−a, where a is a moment when the first D2D device that will transmit the data packet at the transmitting moment t starts detecting a usage condition of a resource pool.

Alternatively, in an embodiment, a bit corresponding to the information of the period is valued to be 0 to indicate that the currently transmitted service is not an SPS/SPT service.

Those of ordinary skilled in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and module described above may refer to the corresponding processes in the method embodiment and will not be elaborated herein for convenient and brief description.

In some embodiments provided by the application, it should be understood that the disclosed system, device and method may be implemented in another manner. For example, the device embodiment described above is only schematic, and for example, division of the modules is only logic function division, and other division manners may be adopted during practical implementation. For example, multiple modules or components may be combined or integrated into another system, or some characteristics may be neglected or not executed. In addition, coupling or direct coupling or communication connection between each displayed or discussed component may be indirect coupling or communication connection, implemented through some interfaces, of the device or the modules, and may be electrical and mechanical or adopt other forms.

The modules described as separate parts may or may not be physically separated, and parts displayed as modules may or may not be physical modules, and namely may be located in the same place, or may also be distributed to multiple network modules. Part or all of the modules may be selected to achieve the purpose of the solutions of the embodiments according to a practical requirement.

In addition, each function module in each embodiment of the disclosure may be integrated into a processing module, each module may also physically exist independently, and two or more than two modules may also be integrated into a module.

When being realized in form of software function module and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer device (which may be a personal computer, a server, network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for Device to Device (D2D) communication, comprising:
generating, by a first D2D device, first Scheduling Assignment (SA) information, wherein the first SA information is used for a Semi-Persistent-Scheduling (SPS) service or a Semi-Persistent-Transmission (SPT) service, and the first SA information comprising information of a period of the SPS service or the SPT service, wherein the information of the period of the SPS service or the SPT service is an index of a period set, and the period set is pre-configured by a protocol; and
transmitting, by the first D2D device, the first SA information to a second D2D device.

2. The method according to claim 1, wherein the first SA information further comprises indication information for indicating a number of times for which untransmitted data in the SPS service or the SPT service is to be transmitted.

3. The method according to claim 1, wherein the first SA information further comprises a process identifier (ID) of the SPS service or the SPT service.

4. The method according to claim 3, wherein the process ID is randomly generated by the first D2D device.

5. The method according to claim 1, wherein a field for the information of the period or the indication information comprises information for indicating terminating the SPS service or the SPT service.

6. The method according to claim 1, wherein the first SA information is to be transmitted at a transmitting moment t, and wherein
the method further comprises: transmitting, by the first D2D device, second SA information at a first moment, the first moment being any moment before the transmitting moment t, and the second SA information being used to indicate that the first D2D device will transmit the first SA information at the transmitting moment t.

7. The method according to claim 6, wherein the first moment is a moment t−a, wherein a is a moment when the first D2D device that will transmit the first SA information at the transmitting moment t starts detecting a usage condition of a resource pool.

8. The method according to claim 1, wherein a bit corresponding to the information of the period is valued to be 0 to indicate that the currently transmitted service is not the SPS service or the SPT service.

9. A method for Device to Device (D2D) communication, comprising:
receiving, by a second D2D device, first Scheduling Assignment (SA) information, wherein the SA information is used for a Semi-Persistent-Scheduling (SPS) service or a Semi-Persistent-Transmission (SPT) service, the first SA information comprising information of a period of the SPS service or the SPT service, wherein the information of the period of the SPS service or the SPT service is an index of a period set, and the period set is pre-configured by a protocol;
acquiring, by the second D2D device, the first SA information; and
acquiring, by the second D2D device, the information of the period of the SPS service or the SPT service from the first SA information.

10. The method according to claim 9, wherein the first SA information further comprises indication information for indicating a number of times for which untransmitted data in the SPS service or the SPT service is to be transmitted.

11. The method according to claim 9, wherein the first SA information further comprises a process identifier (ID) of the SPS service or the SPT service.

12. The method according to claim 11, wherein the process ID is randomly generated by the first D2D device.

13. The method according to claim 9, wherein a field for the information of the period or the indication information comprises information for indicating terminating the SPS service or the SPT service.

14. The method according to claim 9, wherein the first SA information is to be transmitted at a transmitting moment t, and wherein the method further comprises:
receiving, by the second D2D device, second SA information from the first D2D device at a first moment, the first moment being any moment before the transmitting moment t, and the second SA information being used to indicate that the first D2D device will transmit the first SA information at the transmitting moment t.

15. The method according to claim 14, wherein the first moment is a moment t−a, wherein a is a moment when the first D2D device that will transmit the first SA information at the transmitting moment t starts detecting a usage condition of a resource pool.

16. The method according to claim 9, wherein a bit corresponding to the information of the period is valued to be 0 to indicate that the currently transmitted service is not the SPS service or the SPT service.

17. A Device to Device (D2D) device, wherein the D2D device is a first D2D device and comprises:
a processor; and
a memory storing instructions, which, when executed by the processor, cause the processor to perform one or more actions, comprising:
generating first Scheduling Assignment (SA) information, wherein the first Scheduling Assignment (SA) information is used for a Semi-Persistent-Scheduling (SPS) service or a Semi-Persistent-Transmission (SPT) service, and the first SA information comprising information of a period of the SPS service or the SPT service, wherein the information of the period of the SPS service or the SPT service is an index of a period set, and the period set is pre-configured by a protocol; and
transmitting the first SA information to a second D2D device.

18. The D2D device according to claim 17, wherein the first SA information further comprises at least one of the following:
indication information for indicating a number of times for which untransmitted data in the SPS service or the SPT service is to be transmitted or a process identifier (ID) of the SPS service of the SPT service.

* * * * *